United States Patent [19]
Andreoli et al.

[11] 4,275,900
[45] Jun. 30, 1981

[54] FLUID SUSPENSION UNIT FOR MOTORCYCLES

[76] Inventors: Angelo Andreoli, Via Omegna 20, Rivoli (To); Adolfo Boano, Corso Vercelli 122, 10155 Torino; Mario Vesco, Corso Rosselli 111, 10129 Torino, all of Italy

[21] Appl. No.: 937,985

[22] Filed: Aug. 30, 1978

[30] Foreign Application Priority Data

Sep. 16, 1977 [IT] Italy .............. 69052 A/77

[51] Int. Cl.³ ............................................. B60G 15/06
[52] U.S. Cl. .................................. 280/710; 188/314; 267/65 D
[58] Field of Search ............... 188/311, 314, 318, 299, 188/297; 138/30; 280/709, 710; 267/65 D

[56] References Cited
U.S. PATENT DOCUMENTS 3,106,992 10/1963 Sherburne ........................ 188/314
3,141,657 7/1964 Lyon, Jr. ............................ 280/709
3,380,247 4/1968 Colmerauer ..................... 280/709

Primary Examiner—Robert R. Song

[57] ABSTRACT

A fluid suspension unit for motorcycles, particularly off-road motorcycles for cross-country sporting competitions and the like, usable both for the front wheel and the rear wheel of the motorcycle and comprising a pair of hydraulic shock absorbers, a pair of valves connected to each of said hydraulic shock absorbers for adjusting the working strokes thereof, and a compensation tank divided by an elastically deformable membrane into an uncompressed air chamber and a fluid chamber communicating with the closed hydraulic fluid circuit including said shock absorbers and said valves. This fluid suspension unit affords the advantage over conventional fluid suspension units having independent shock absorbers that the load is equally distributed on both sides of the supported motorcycle wheel and that the rate of elasticity of the shock absorbers can be adjusted at any time by the motorcyclist without having to dismount from the motorcycle.

5 Claims, 3 Drawing Figures

FLUID SUSPENSION UNIT FOR MOTORCYCLES

BACKGROUND OF THE INVENTION

This invention relates to a fluid suspension unit for motorcycles, more particularly an oleopneumodynamic unit for elastic suspension of the wheels in motorcycles, particularly off-road motorcycles for cross-country sporting competitions and the like.

It is known that the front and rear suspensions of motorcycles are of prime importance for the stability, driving and steering properties of the motorcycle. This is true particularly for off-road motorcycles such as those used, for example, in cross-country sporting competitions and the like in which the track is extremely rough.

The known elastic suspensions for motorcycles are formed of a pair of independent shock absorbers applied to each side of the front and rear forks of the motorcycle. These known suspensions have among other items the drawback that the range or rate of elasticity has to be adjusted before using the motorcycle and whenever it is later necessary to vary this range or rate of elasticity, these rather complex adjusting operations have to be repeated and also mostly they have to be carried out by skilled staff so that a motorcyclist who takes part in a motoring competition usually does not have the possibility or time to adjust the rate of elasticity of the motorcycle suspensions according to the roughness of the track.

SUMMARY OF THE INVENTION

It is a main object of the present invention to eliminate this drawback by providing a fluid suspension unit for motorcycles, particularly off-road motorcycles for cross-country sporting competitions and the like, which can be used both for the rear wheel and the front wheel of the motorcycle and permits the motorcyclist to adjust the rate of elasticity of the suspensions according to the roughness of the track at any time without dismounting from the motorcycle.

It is another object of the present invention to provide a fluid suspension unit of the type described above, which is of simple and sturdy construction, reliable operation and long service life.

These and other objects and advantages of the invention, which will become apparent from the following detailed description and the appended claims, are achieved according to the invention by a fluid suspension unit for motorcycles, particularly off-road motorcycles for cross-country sporting competitions and the like, and which can be used both for the rear wheel and the front wheel of the motorcycle and is characterized in that it essentially comprises hydraulic shock absorber means, standardized adjustable double-acting control means for adjusting the working strokes of said hydraulic shock absorber means, and hydraulic and pneumatic compensation means, all these means being connected together in a closed hydraulic fluid circuit.

DESCRIPTION OF PREFERRED EMBODIMENT

Figure 1:
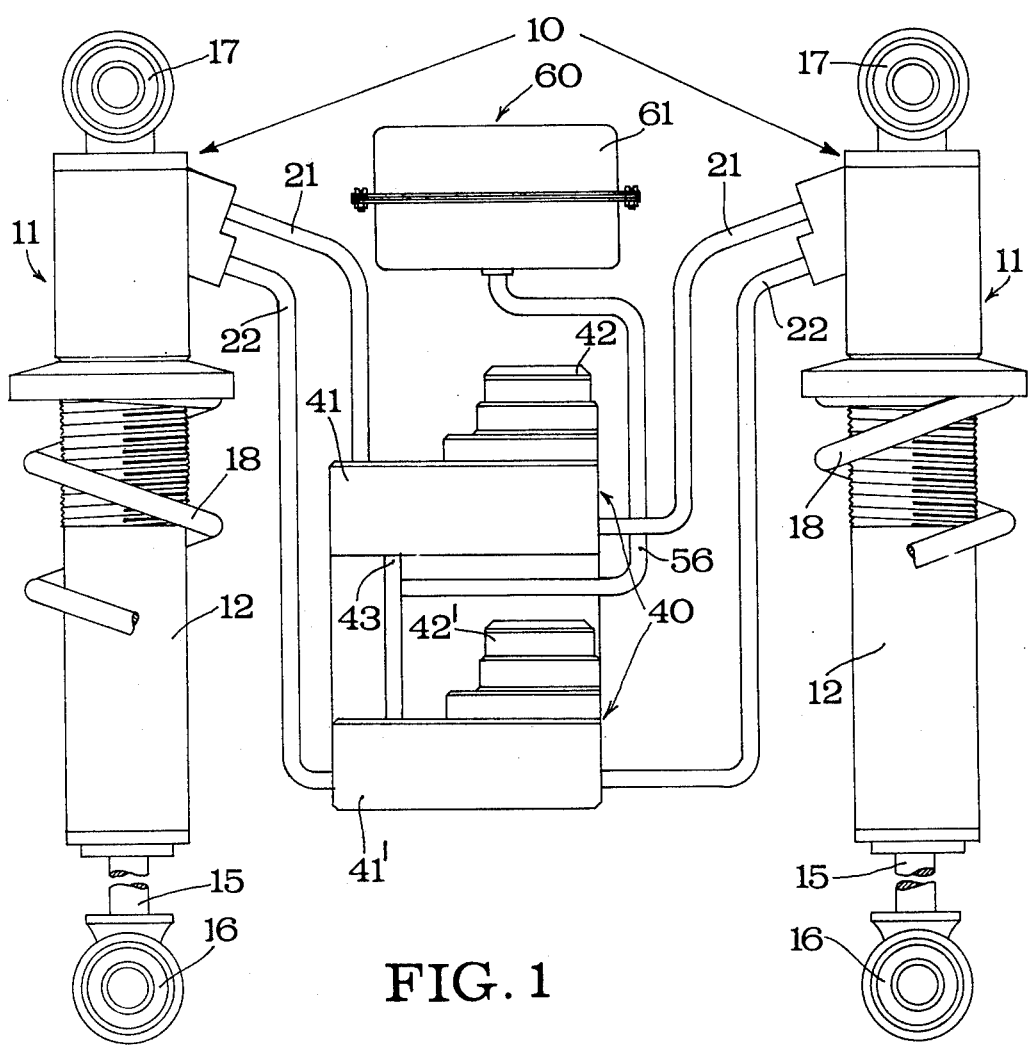
FIG. 1 is a partially schematic overall view of a fluid suspension unit for motorcycles according to the invention.

The Figures of the drawings show the overall assembly of the fluid suspension unit for motorcycles according to the invention. Conventional parts of the motorcycle are not explained and provided with reference numerals in the drawings where this is not strictly necessary for understanding the present invention. The compression stroke of the hydraulic shock absorber means is indicated by a black arrow whereas the extension stroke thereof is indicated by a white arrow. Similarly the corresponding fluid paths are indicated by black and white arrows.

The hydraulic shock absorber means of the fluid suspension unit are generally indicated by 10, the standardized adjustable double-acting control means for adjusting the working strokes of the hydraulic shock absorber means are generally denoted by 40 and the hydraulic and pneumatic compensation means is generally designated by 60. All these means are connected together in a closed hydraulic fluid circuit.

Figure 2:
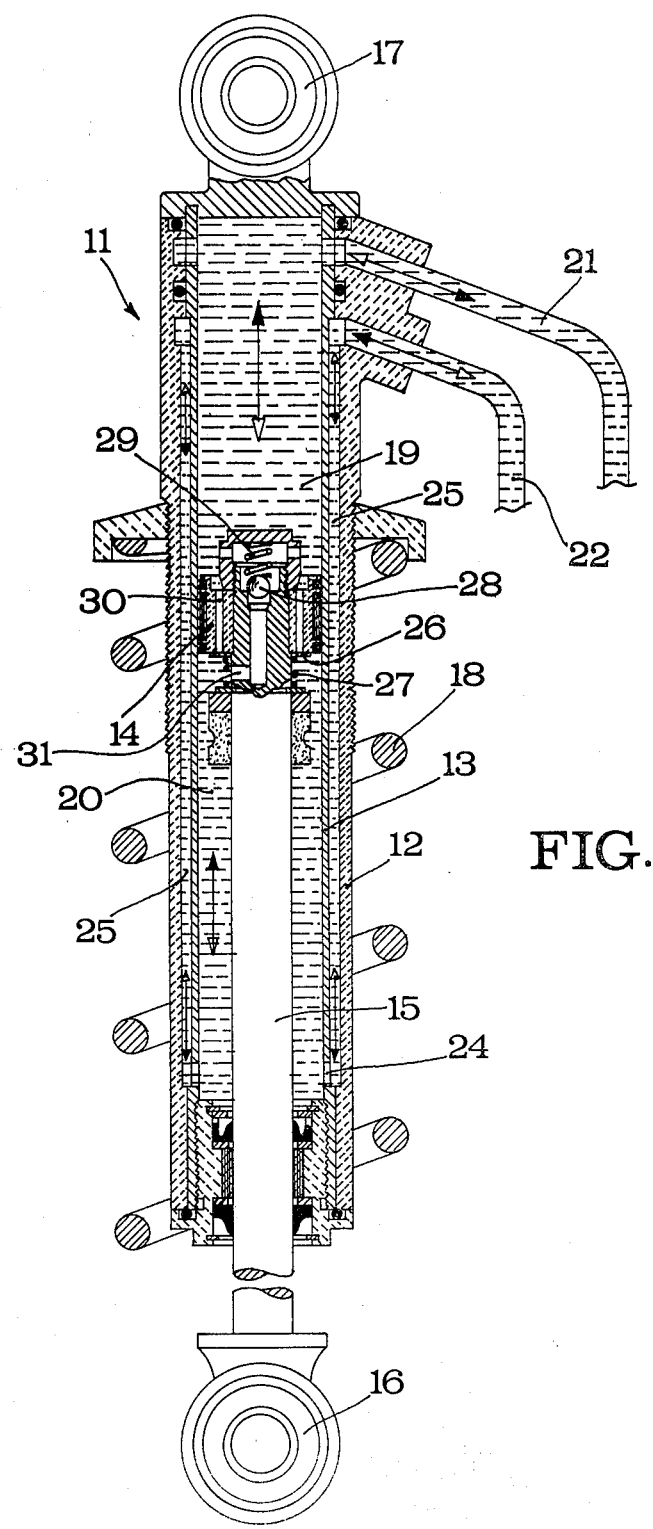
FIG. 2 is an axial sectional view of a hydraulic shock absorber forming part of the fluid suspension unit of FIG. 1.

The hydraulic shock absorber means 10 comprise a pair of similar hydraulic shock absorbers 11 each of which is formed of an outer cylinder 12 and a coaxial inner cylinder 13, as shown in FIG. 2. A piston 14 supported by a piston rod 15 is slidably mounted within the inner cylinder 13 of each hydraulic shock absorber.

The lower end of the piston rod 15 projecting from the cylinders 12 and 13 is provided with an annular boss 16 for pivotal connection to the fork (not shown) of the motorcycle, this annular boss supporting the axle, for example, of the rear wheel of the motorcycle. Each of the hydraulic shock absorbers 11 further carries at its upper end an annular boss 17 for pivotal connection, for example, to the rear portion of the motorcycle frame with the interposition of a sturdy helical spring 18.

Although the illustrated embodiment of the fluid suspension unit is designed for application to the rear wheel of the motor-cycle it will be understood that by a few slight modifications to the arrangement of the mechanical connection means the fluid suspension unit may also be used on a front wheel of a motorcycle.

The piston 14 of each of the shock absorbers 11 divides the inner cylinder 13 into two distinct fluid chambers, i.e. a compression chamber 19 and an expansion chamber 20. A hydraulic fluid conducting flexible pipe 21 connects the two compression chambers 19 of the pair of shock absorbers 11 while another hydraulic fluid conducting flexible pipe 22 connects the two expansion chambers 20 of the pair of shock absorbers 11. The hydraulic fluid conducting flexible compression and expansion pipes 21 and 22 connect the hydraulic shock absorber means 10 formed by the pair of shock absorbers 11 to the standardized adjustable double-acting control means, which will be described in greater detail hereinafter, to adjust the working strokes of said hydraulic shock absorber means.

The piston 14 of each of the hydraulic shock absorbers 11 is provided with a high pressure disk valve 26 subjected to the action of a helical spring 27 for the compression stroke as well as a high pressure ball valve 28 subjected to the action of a compression spring 29 for the expansion stroke. These valves have a very high rating so as to enter into operation only when the working pressure in the corresponding working circuit increases considerably. Thus, they act as safety valves as well as auxiliary valves to the standardized adjustable double-acting control means.

Ducts 30 are provided in the piston 14 of each of the hydraulic shock absorbers 11 to permit the hydraulic fluid to flow from the compression chamber 19 to the expansion chamber 20 and ducts 31 are provided in the piston rod 15 of the piston 14 to permit the hydraulic fluid to flow from the expansion chamber 20 to the compression chamber 19.

The standardized adjustable double-acting control means indicated generally by 40 for adjusting the working strokes of the hydraulic shock absorber means are formed by a pair of similar valves 41 and 41'. These valves 41 and 41' are assembled in a single body of very reduced dimensions to permit them to be mounted on the motorcycle in the most convenient position for the driver. Only for greater clarity of the drawings these valves 41 and 41' are shown therein in a separate form. Hydraulic fluid is supplied to the valve 41 through the flexible pipe 21 connected to the two compression chambers 19 of the pair of hydraulic shock absorbers. The valve 41' receives hydraulic fluid through the flexible pipe 22 connected to the two expansion chambers 20 of the pair of hydraulic shock absorbers 11. Each of the valves 41 and 41' is provided with an adjusting knob 42, 42' and they communicate with one another through a fluid conducting duct 43.

When the pistons 14 of the pair of hydraulic shock absorbers or rams 11 carry out the compression stroke, the hydraulic fluid flows from the pair of compression chambers 19 of the shock absorbers through the flexible pipe 21 to a chamber 44 in the valve 41 where it exerts pressure on an adjustable disk valve 45 which regulates its flow rate and speed. The thus controlled compressed hydraulic fluid then flows into a chamber 46 in the valve 41 and through the duct 43 enters a chamber 46' in the valve 41'. From the chamber 46' the hydraulic fluid flows freely into a chamber 44' in the valve 41' through a disk check valve 47' that does not obstruct its flow although it is under the action of a compression spring 48'. From the chamber 44' the hydraulic fluid is distributed into the flexible pipes 22 and then flows through longitudinal channels 25 and apertures 24 in the inner cylinder 13 to the expansion chamber 20 in the hydraulic shock absorbers 11.

During the following expansion stroke the hydraulic fluid flows along the same path in opposite direction with the only difference that it will then be the valve 41' to control its flow rate and speed. Thus the valves 41 and 41' alternatively perform an active and an inactive working cycle, but their structure and operation is the same.

The adjustable disk valve 45 which controls the flow rate of the hydraulic fluid is actuated directly by a valve stem 49 under the action of a compression spring 50, this plunger being operative when the hydraulic fluid is under low pressure. When the pressure of the hydraulic fluid is higher than the medium pressure, the pressure of the adjustable disk valve 45 is opposed by a compression spring 51.

The lower surface of the adjusting knob 42 of each of the valves 41 and 41' is provided with a stepped circular groove having steps of progressively diminishing height urging against a ball 52. A small plunger 53 engaging the ball 52 acts upon the compression spring 51 which in turn acts upon the adjustable disk valve 45. A ball 54 and a helical compression spring 55 urging thereagainst ensure stepwise positioning of the adjusting knob 42.

The disk check valves 47, 47' serve to permit free flow of the hydraulic fluid from the chambers 44, 44' to the chambers 46 and 46', respectively, and to prevent return flow of the hydraulic fluid in the opposite direction.

The standardized control means generally indicated by 40 are double-acting control means in the sense that they control the two working strokes of the hydraulic shock absorber means 10 and they work under low and medium pressure and in case of need they are assisted by the high pressure valves of the hydraulic shock absorber means.

Figure 3:
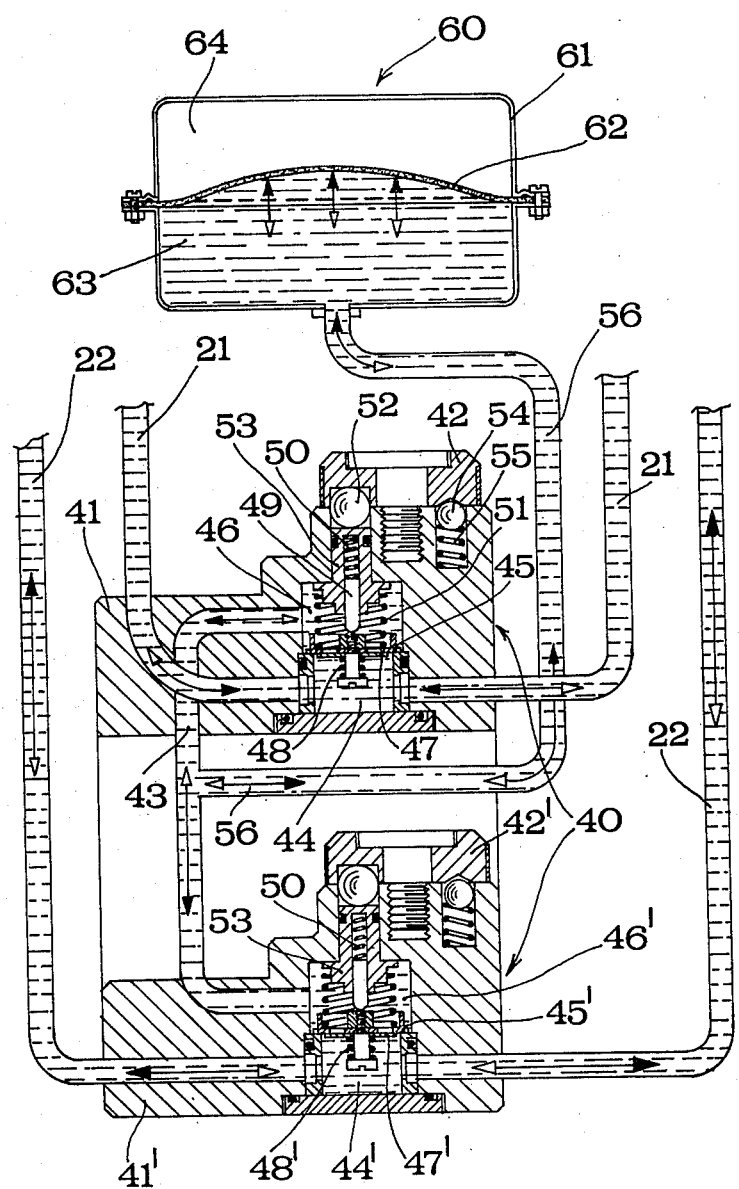
FIG. 3 is a sectional view of the control means forming part of the fluid suspension unit of FIG. 1.

A hydraulic fluid conducting flexible pipe 56 branches off from the duct 43 that interconnects the valves 41 and 41' and leads to the hydraulic and pneumatic compensation means which is generally indicated by 60 and will now be described in greater detail with reference to FIG. 3. This hydraulic and pneumatic compensation means comprises a tank 61 divided by an elastically deformable membrane 62 into two chambers 63 and 64. This tank may be secured to the motorcycle in any convenient position. The chamber 63 communicates with the closed hydraulic fluid circuit through the flexible pipe 56 that is connected to the standardized control means generally indicated by 40. The chamber 64 contains uncompressed air.

This hydraulic and pneumatic compensation means serves to receive the excess of hydraulic fluid produced by the volumetric difference of the piston rods 15 of the pair of hydraulic shock absorbers 11 during the compression stroke. During the compression stroke the excess of hydraulic fluid in fact enters the flexible pipe 56 and then the chamber 63 where it exerts pressure on the elastically deformable membrane 62 which compresses the air contained in the chamber 64 and produces a very slight pressure therein.

During the following expansion stroke the hydraulic fluid gradually recovers the volumetric difference produced in the hydraulic circuit during the compression stroke and thus the pressure produced in the air chamber 64 acts upon the elastically deformable membrane 62 to facilitate the discharge of the hydraulic fluid from the chamber 63. In the rest position, which corresponds to the maximum extension of the piston rods 15 of the pair of hydraulic shock absorbers 11 during the expansion stroke, the elastically deformable membrane 62 is not subjected to any stress either from the hydraulic fluid in the saturated hydraulic circuit or from the uncompressed air in the chamber 64.

According to another embodiment, not shown, the elastically deformable membrane 62 and the chamber 64 containing uncompressed air could be replaced, for example, by one or more members made of elastic material and containing uncompressed air in their interior whereby substantially the same effect would be achieved.

The fluid suspension unit according to the invention for motorcycles, particularly off-road motorcycles for cross-country sporting competitions and the like, essentially affords the following advantages:

It permits the motorcyclist to adjust the rate of elasticity of the suspensions according to the roughness of the track at any time without dismounting from the motorcycle.

It ensures exactly the same operation of the shock absorbers both during the compression and the expansion strokes. During the compression stroke the resistance to be overcome and the pressure to be absorbed are the same and during the expansion stroke the shock absorbers return simultaneously. This synchronism of movement prevents the wheel axle from deviating from its required axial direction due to torsional movements of the wheel fork as often occurs in the conventional independent shock absorbers with consequent side skidding of the motorcycle.

It ensures a rational circulation of the fluid in the hydraulic circuit and efficient cooling thereof so that the characteristics of the hydraulic fluid will remain unchanged even after many hours of operation and an increase of the fluid volume and the formation of condensate will be avoided.

While a preferred embodiment of the invention has thus been described in detail and illustrated in the accompanying drawings it will be understood by those skilled in the art that numerous changes and modifications may be made therein without departing from the scope of the invention as defined by the appended claims.

We claim:

1. A fluid compensation unit for motorcycles, particularly off-road motorcycles for cross-country sporting competitions and the like, usable both for the rear wheel and the front wheel of the motorcycle, comprising a pair of hydraulic shock absorbers for each wheel, each hydraulic shock absorber including an outer cylinder and an inner cylinder, defining an annular fluid chamber therebetween, a piston slidably mounted within and longitudinally of said inner cylinder, dividing said inner cylinder into a compression fluid chamber on one side of said piston and an expansion fluid chamber on the other side of said piston, duct means within said piston for for communication between said compression and expansion fluid chambers, means for communicating between said expansion fluid chamber and said annular fluid chamber, said piston having a piston rod connectable to a wheel supporting portion of the motorcycle, said outer cylinder being connectable with its end opposed to said piston rod to a fixed frame portion of the motorcycle; a pair of adjustable control valves connected in series by flexible pipes to said compression fluid chamber and through said annular fluid chamber to said expansion fluid chamber in said inner cylinder and a fluid pressure compensation tank connected by a flexible pipe to said pair of adjustable control valves.

2. A fluid compensation unit for motorcycles as claimed in claim 1, wherein said control valves are adjustable manually independently of one another and arranged in the fluid circuit connecting said compression and expansion fluid chambers in said inner cylinder so that during the compression stroke of said hydraulic shock absorbers one of said valves will be acted upon by fluid pressure in one direction and the other of said valves in the opposite direction, these directions being inverted during the expansion stroke of said hydraulic shock absorbers.

3. A fluid compensation unit for motorcycles as claimed in claim 1, wherein each of said pair of adjustable control valves comprises a disk valve acted upon, on one side, by a first compression spring having a relatively low spring force and acting upon the disk valve through a valve stem, and a second compression spring having a greater spring force than said first compression spring and, on the other side, by a third compression spring acting in opposition to said first and second springs.

4. A fluid compensation unit for motorcycles as claimed in claim 1, wherein each of said adjustable control valves is separately manually adjustable by means of a control knob provided on one side with a stepped circular groove having steps of progressively diminishing height urging against a ball engaged by a plunger acting through a compression spring on a valve disk, said control knob being further engaged by another ball under the action of a compression spring to ensure stepwise positioning of said control knob.

5. A fluid compensation unit for motorcycles as claimed in claim 1, wherein said duct means in said piston comprises first and second passages, said first passageway being provided with a high pressure disk valve subjected to the action of a helical spring and said second passage being provided with a high pressure disk valve subjected to the action of a compression spring, said high pressure disk and ball valves being operable to open in opposite directions during the compression and expansion strokes, respectively, only when the respective working fluid pressure is exceptionally high, thus serving as safety valves.

* * * * *